United States Patent [19]

Auerbach et al.

[11] Patent Number: 5,260,942

[45] Date of Patent: Nov. 9, 1993

[54] METHOD AND APPARATUS FOR BATCHING THE RECEIPT OF DATA PACKETS

[75] Inventors: Richard A. Auerbach, Somers, N.Y.; Jerry A. Blades, Rochester, Minn.; Jonathan W. Byrn, Rochester, Minn.; Gary S. Delp, Rochester, Minn.

[73] Assignee: International Business Machines Corporation, Armonk, N.Y.

[21] Appl. No.: 847,470

[22] Filed: Mar. 6, 1992

[51] Int. Cl.⁵ .............................................. H04J 3/14
[52] U.S. Cl. ..................................... 370/94.1; 370/17
[58] Field of Search ................................... 370/17, 94.1

[56] References Cited

U.S. PATENT DOCUMENTS

| | | | |
|---|---|---|---|
| 4,712,214 | 12/1987 | Meltzer et al. | 371/32 |
| 4,954,965 | 9/1990 | Johnson et al. | 364/514 |
| 5,025,458 | 6/1991 | Casper et al. | 375/114 |
| 5,056,058 | 10/1991 | Hirata et al. | 364/900 |
| 5,113,392 | 5/1992 | Takiyasu et al. | 370/94.1 X |

OTHER PUBLICATIONS

1989 IEEE 0163-6804/89/0006-0023 pp. 23-29 An Analysis of the TCP Processing Overhead by D. D. Clark, V. Jacobson, J. Romkey and H. Salwen.

Primary Examiner—Douglas W. Olms
Assistant Examiner—Russell W. Blum
Attorney, Agent, or Firm—Duke W. Yee; Andrew J. Dillon

[57] ABSTRACT

A method and a system in a distributed data processing network for enhancing the processing of a plurality of related data packets received at a receiving station within the distributed data processing network, each of the data packets having a header associated herewith includes sequentially receiving a number of data packets at the receiving station. Next, the header associated with a first data packet is examined and predicted profile is generated for comparison with a related subsequent data packet. The next data packet received is then compared with the predicted profile to determine whether or not the two data packets may be consolidated.

17 Claims, 5 Drawing Sheets

Fig. 2

METHOD AND APPARATUS FOR BATCHING THE RECEIPT OF DATA PACKETS

BACKGROUND OF THE INVENTION

1. Field of the Invention

The present invention generally relates to a method and apparatus for processing incoming data packets and in particular to method and apparatus for reducing overhead in processing data packets.

2. Description of the Related Art

Various communication systems, computer systems, and networks of computers transmit and receive information in the form of frames or data packets. That is, a message or a file may be broken up into many data packets and sent to another user or computer on the system or network. Each data packet is a separate entity on the transmission media. In the transmission of these data packets, a processing overhead exists in terms of the time needed to process the data packet.

Batching or consolidating single data packets into groups can reduce the processing overhead when compared to processing the same number of data packets separately. Consequently, consolidating data packets into a group or a super data packet can reduce the processing overhead since the system can process the super data packet a single time. Consolidating data packets into super data packets, however, presents some problems. Data packets may arrive on the transmission media asynchronously and at somewhat random intervals. In addition, data packets transmitted as a group from a source system do not always arrive as a group at the target or receiving system. That is, data packets from multiple connections may be interspersed among each other.

Some data processing systems include a special dedicated bit in the processing header of the data packets as a form of identification. This type of system, however, requires both the sending system and the receiving system to be aware of the dedicated bit, in order to decrease processing overhead of the data packets. The "header" is that portion of a message which contains control information for the message such as: one or more destination fields; the name of the originating station; an input sequence number; a character string indicating the type of message; and, a priority level for the message.

Therefore, it would be desirable to have a method and apparatus for consolidating data packets into groups to reduce the overhead necessary to process the data packets without requiring both the sending and receiving systems to observe a protocol which identifies batched data packets.

SUMMARY OF THE INVENTION

It is therefore an object of the present invention to provide an enhanced method and apparatus for processing incoming data packets.

It is another object of the present invention to increase the performance of a computer system receiving incoming data packets.

It is another object of the present invention to provide a method and apparatus for reducing overhead in processing data packets.

It is a further object of the present invention to provide a method and apparatus for reducing overhead in processing incoming data packets through consolidating related data packets.

It is yet another object of the present invention to provide a method and apparatus for reducing overhead in processing data packets through consolidating related data packets without requiring both the sending station and the receiving station having to be aware of the protocol for batching data packets together.

The foregoing objects are achieved as is now described. In accordance with the present invention, a method and apparatus are provided in a distributed data processing network for enhancing processing of a plurality of related data packets received at a receiving station within the distributed data processing network. First, a data packet is received at the receiving station. Next, a header associated with a first data packet is examined and a predicted profile is generated for comparison with a related subsequent data packet. The next data packet is received and then is compared with the predicted profile to determine whether or not the two data packets may be grouped.

Data packets may thereafter be associated if the header of a second data packet matches the predicted profile, forming an associated data packet group. The receiving station or processor also batches the data packets for the host system.

Additional objects, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
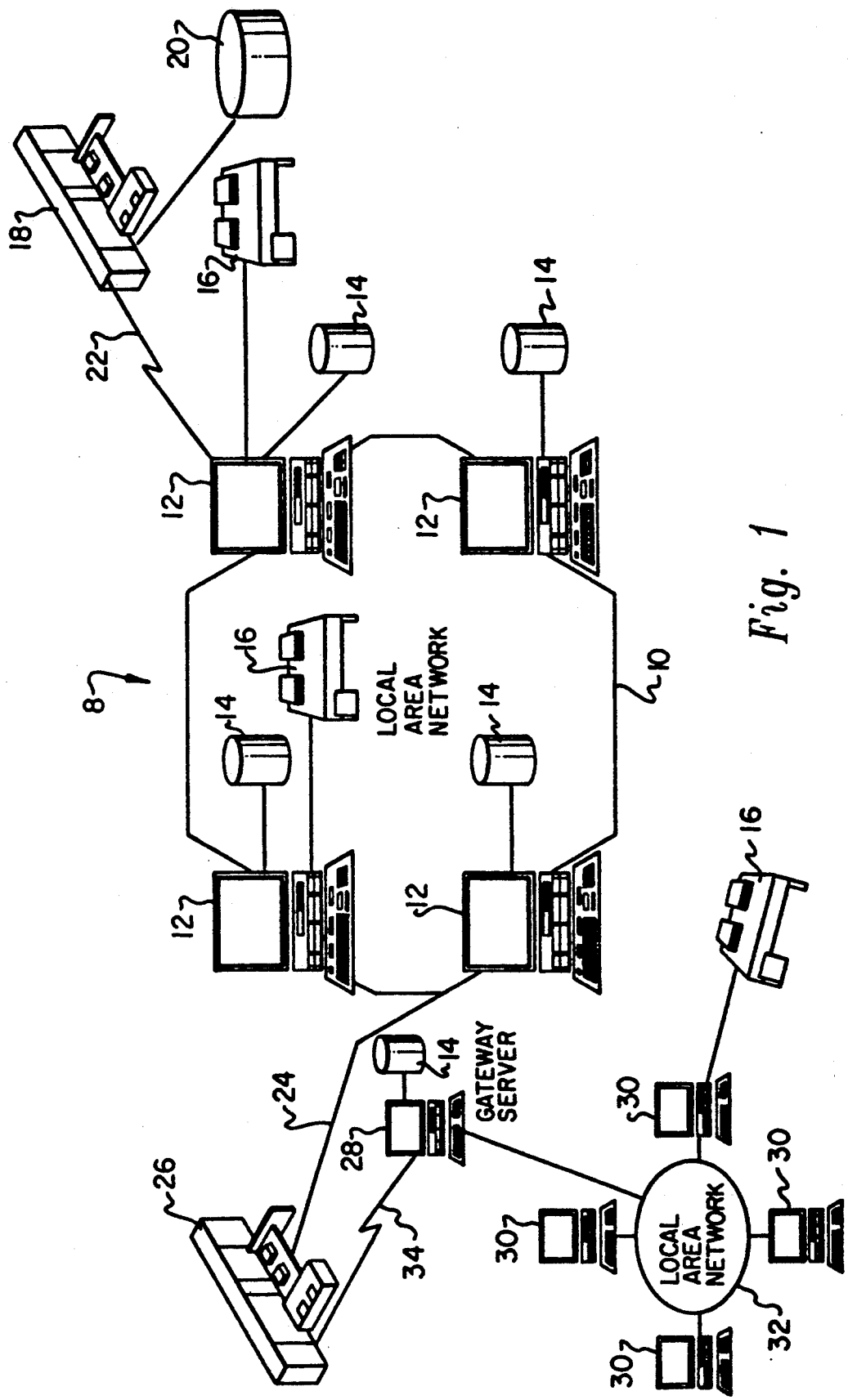
FIG. 1 depicts a typical data processing network which may be utilized to implement the present invention.

With reference now to the figures, and in particular with reference to FIG. 1, there is depicted a typical data processing network 8 which may be utilized to implement the present invention. As may be seen, data processing network 8 may include a plurality of local area networks, such as Local Area Networks ("LAN") 10 and 32, each of which preferably includes a plurality of individual computers 12 and 30, respectively. Of course, those skilled in the art will appreciate that a plurality of Intelligent Work Stations coupled to a host processor may be utilized for each such network.

As is common in such data processing networks, each individual computer may be coupled to a storage device 14 and/or a printer/output device 16. One or more such storage devices 14 may be utilized, in accordance with the present invention, to store documents or resource objects which may be periodically accessed by any user within data processing system 8. In a manner well known in the prior art, each such document or resource object stored within a storage device 14 may be freely interchanged throughout data processing network 8 by transferring a document to a user at an individual computer 12 or 32, for example.

Still referring to FIG. 1, it may be seen that data processing network 8 may also include multiple mainframe computers, such as mainframe computer 18, which may be preferably coupled to Local Area Network ("LAN") 10 by means of communications link 22. Main frame computer 18 may also be coupled to a storage device 20 which may serve as remote storage for Local Area Network ("LAN") 10. Similarly, Local Area Network ("LAN") 10 may be coupled via communications link 24 through a subsystem control unit/communications controller 26 and communications link 34 to a gateway server 28. Gateway server 28 is preferably an individual computer or Interactive Work Station ("IWS") which serves to link Local Area Network ("LAN") 32 to Local Area Network ("LAN") 10.

As discussed above with respect to Local Area Network ("LAN") 32 and Local Area Network ("LAN") 10, a plurality of documents or resource objects may be stored within storage device 20 and controlled by main frame computer 18, as Resource Manager or Library Service for the resource objects thus stored. Of course, those skilled in the art will appreciate that main frame computer 18 may be located a great geographic distance from Local Area Network ("LAN") 10 and similarly Local Area Network ("LAN") 10 may be located a substantial distance from Local Area Network ("LAN") 32. For example, Local Area Network ("LAN") 32 may be located in California while Local Area Network ("LAN") 10 may be located within Texas and main frame computer 18 may be located in New York.

Electronic mail, files, documents, and other information may be sent between any of individual computers 12 and 30, gateway server 28, a computer within LAN 10 or LAN 32, or mainframe computer 18, through various communications links or media. Communications media, as those skilled in the art will appreciate, are the media or systems which connect two or more computers, systems, or networks together.

Figure 2:
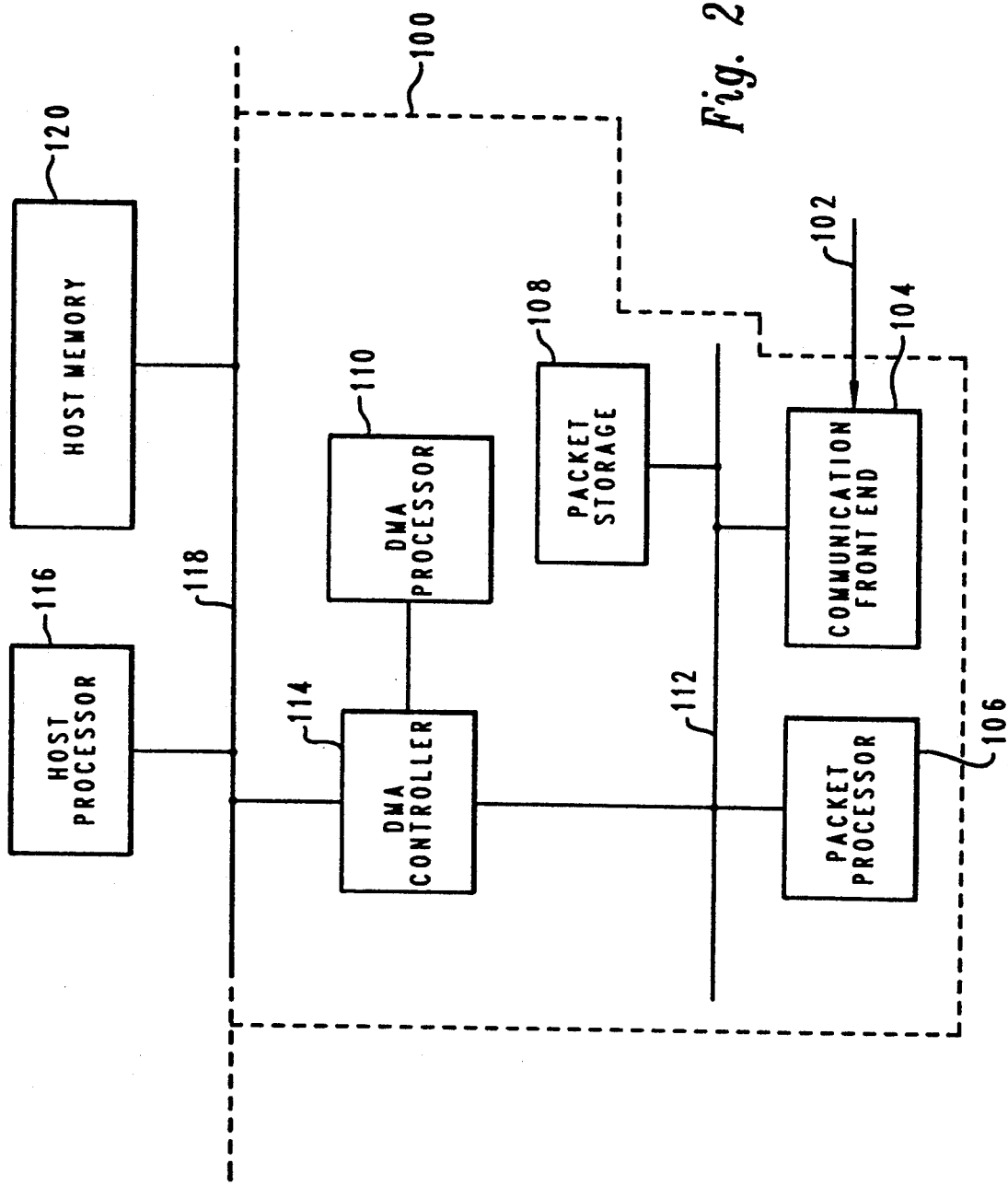
FIG. 2 is a schematic representation of a receiving station for grouping data packets or frames in accordance with a preferred embodiment of the present invention.

Referring now to FIG. 2, there is depicted a schematic representation of a receiving station 100 which may be utilized for grouping data packets or frames under a preferred embodiment of the present invention. Receiving station 100 receives data packets or frames from a communications link 102 at a communications front end 104. Communications front end 104 contains the circuitry for transmitting and receiving data and is utilized to communicate with other systems.

When a data packet or frame is received, it is examined by data packet processor 106 and stored in data packet storage 108 before being sent to DMA processor 110. Communications front end 104, data packet processor 106, and data packet storage are all connected by communications bus 112.

DMA controller 114 is preferably connected to and controlled by DMA processor 110. DMA controller 114 receives data packets from communications bus 112 and sends the data packets to host processor 116, through its connection to system bus 118. The data packets are processed by host processor 116 and stored in host memory 120.

In a preferred embodiment of the present invention, receiving station 100 receives a first data packet from communications link 102. Data packet processor 106 examines the header of the first data packet and prepares the first data packet to be sent to DMA processor 110. A second data packet is then received and the header of the second packet is also examined. Before the first data packet is transmitted to DMA processor 110, a determination is made as to whether the second data packet and the first data packet may be grouped together.

In accordance with an important feature of the present invention, only the information present within each data packet is necessary to determine whether or not the data packets may be grouped together. This is accomplished utilizing a profile which is established by examining the header of the first data packet received. The significant fields of subsequent packets are then determined and these fields are then utilized to form a predicted profile. Different portions of the data packet, other than the header, may also be examined, depending on the specific communications protocol utilized.

The second packet received may be examined utilizing a mask to eliminate insignificant fields and the result compared with the predicted profile. IF statements or similar constructs in code may also be utilized in place of a mask.

Specifically, in a preferred embodiment of the present invention, the grouping of multiple data packets involves the particular LLCSAP (Logical Link Control Service Access Point) unique identification tuple which is utilized in a fiber distributed data interface ("FDDI") protocol. The tuple corresponds to a particular service access point, a particular host, a particular remote access point, and a particular remote host and is obtained from the header of the first data packet to form a profile for comparison with the header of a second data packet.

For example, a file sent as data packets from a particular station will have unique connection or source. The receiving station, in accordance with an embodiment of the present invention, recognizes that the next data packet is from the same connection as the current data packet. This information is normally present in the headers of data packets and is confirmed utilizing a predicted profile as described above. Consequently, no additional information or modification of the data packet is needed in order to compare a data packet to another data packet for possible batching.

If the established profiles match, data packet processor 106 sets a bit or a "flag" to notify DMA processor 110 that the second data packet may be grouped with the first data packet. The bit or flag is referred to as a "next-match bit". This bit may be set in hardware or software at the receiving station and in either case, does not require modifying the data packets.

This process of comparing profiles from data packets continues thereafter until either a data packet from a different connection is received, or no additional data packets are received during a specified time interval from the communications link. For example, a timer may be reset each time a packet is received. The length of the time interval may be fixed or may vary, for example, with network traffic or the amount of data in the buffer. After one of these two events occurs, data packet processor 106 does not set the bit or "flag" when sending a data packet up to DMA processor 110, via DMA controller 114 and will then wait for the next data packet.

In accordance with a preferred embodiment of the present invention, grouping of data packets only occurs when DMA processor 110 is slowing down the process of transferring data packets to host processor 116. For example, if data packets are received slower than or as fast as they can be sent to host processor 116, then grouping will not occur. On the other hand, if data packets are being sent to DMA processor 110 faster than DMA processor 110 can send them up to host processor 116, then grouping will occur.

In the depicted embodiment of the present invention, data packet processor 106 may be implemented utilizing an Intel 80386 microprocessor and DMA controller 114 may be implemented utilizing a Motorola MC 68020 microprocessor. More information on Intel 80386 Microprocessors can be found in 80386 Programmer's Reference Manual, order number 230985-001 and 80386 Hardware Reference Manual, order number 231732-001 from Intel Corporation. More information on the Motorola MC 68020 Microprocessor can be found in MC68020 32-Bit Microprocessor User's Manual from Motorola Incorporated, ISBN 0-13-566878-6. Although the depicted embodiment utilizes two processors for batching data packets, in an alternate embodiment a single processor may be utilized to perform the batching function.

Figure 3:
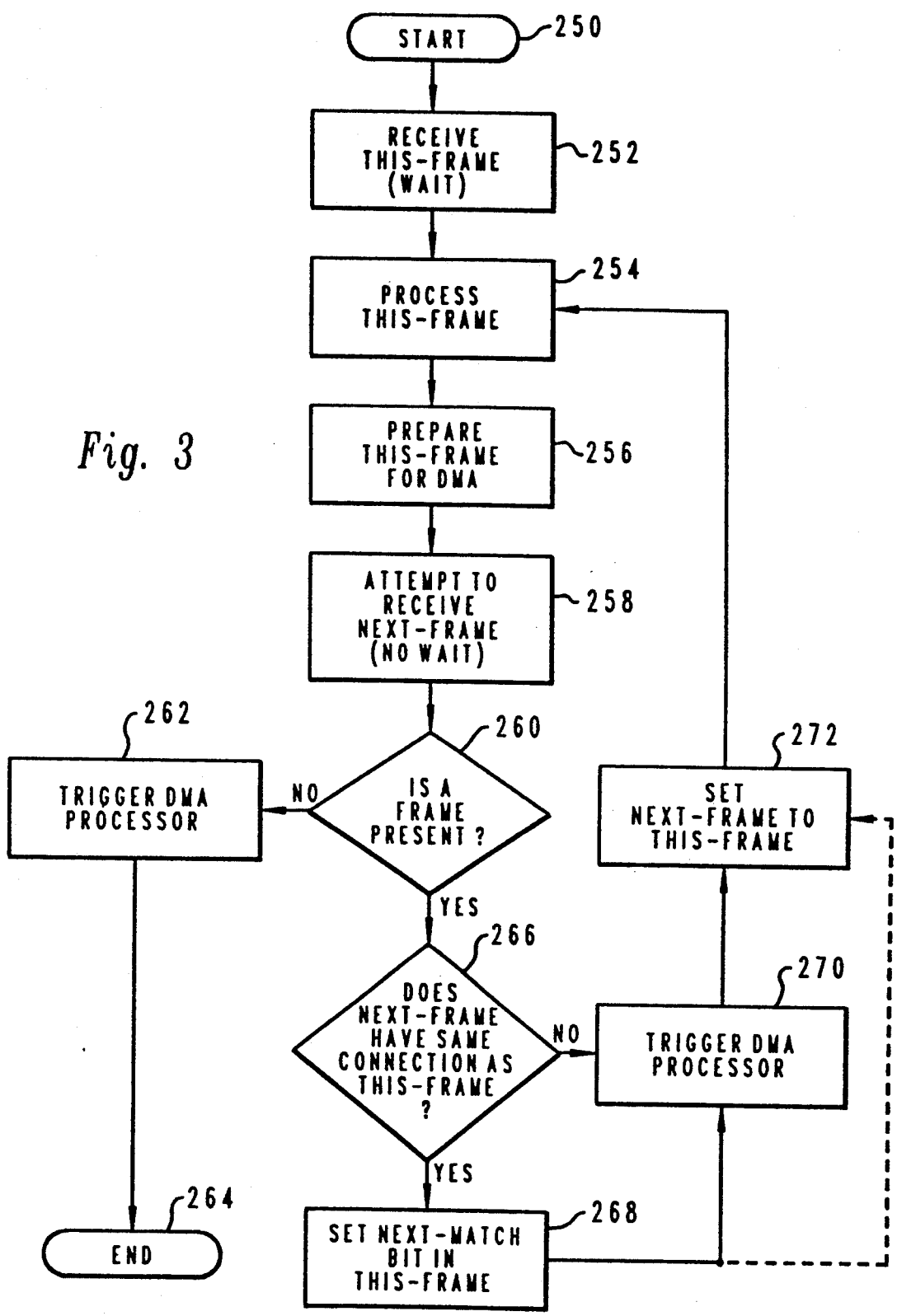
FIG. 3 depicts a high level flow chart of processing data packets in a data packet processor at a receiving station in accordance with a preferred embodiment of the present invention.

With reference now to FIG. 3, there is depicted a high level flow chart illustrating processing of data packets in a data packet processor at a receiving station in accordance with a preferred embodiment of the present invention. As illustrated, the process begins at block 250 and thereafter proceeds to block 252 which depicts a wait state. The process waits, as illustrated at block 252, until THIS-FRAME, a data packet or frame, is received. When THIS-FRAME is received, the process proceeds to block 254, which illustrates the processing of THIS-FRAME. In processing THIS-FRAME, the header of the data packet is examined to produce a predicted profile for the data packet. Although this particular embodiment of the present invention utilizes the header of the data packet to produce a predicted profile, other portions of the data packet may also be utilized to produce a predicted profile, depending upon the protocol utilized. The process then proceeds to block 256, which depicts the preparing of THIS-FRAME for the DMA processor.

Block 258 next illustrates the reception of a data packet or frame labeled NEXT-FRAME. The process does not wait for a data packet or frame to arrive in block 258. If no data packet or frame is present when the process attempts to receive a frame, no NEXT-FRAME will be present. Thereafter, the process proceeds to block 260, which depicts a determination of whether or not a frame is present. If a frame is not present, the process then proceeds to block 262, which illustrates triggering the DMA processor. Triggering of the DMA processor causes THIS-FRAME to be sent to the DMA processor. The process thereafter terminates, as illustrated in block 264.

Referring again to block 260, if a subsequent frame or data packet is present, the process then proceeds to block 266, which depicts a determination of whether or not NEXT-FRAME has the same connection or source as THIS-FRAME. This determination is accomplished by comparing the predicted profile with the header of NEXT-FRAME. If the connection is identical, the process then proceeds to block 268, which illustrates setting the next-match bit for THIS-FRAME. The next-match bit may be set in either hardware or software, and not within the data packet or frame itself.

Next, the process proceeds to block 270, which depicts the triggering of the DMA processor. Block 272 illustrates NEXT-FRAME being set to THIS-FRAME. That is, the label is changed such that NEXT-FRAME is now identified as THIS-FRAME. The process then returns to block 254.

In an alternate implementation of the present invention, the process may pass from block 268 to block 272. In such an alternate implementation the DMA would be triggered only when an entire super packet is complete, rather than upon receipt of each individual data packet.

In accordance with the depicted embodiment of the present invention, identification of data packets to be grouped together may be accomplished without adding additional information to the data packets. For example, the data packet processor, an Intel 80386 in a preferred embodiment of the present invention, may be programmed to recognize data packets which are to be grouped together. Specifically, the grouping of data packets may be accomplished in a preferred embodiment of the present invention by examining the particular LLCSAP ("Logical Link Control Service Access Point") unique identification tuple which is located in the header of the data packet. As set forth above, the tuple corresponds to a particular service access point, a particular host, a particular remote access point, and a particular remote host. By examining this information, a determination can be made as to whether or not two data packets are from the same source and consequently whether or not the two data packets may be grouped together.

Those skilled in the art will realize that in other systems for transferring data packets, the data packets normally contain some unique identification information that allows for grouping or consolidating of data packets. Those skilled in the art will also recognize that the actual comparison of data packets may depend on the particular information utilized to produce a predicted profile.

As described above, in one embodiment of the present invention, the receiving station processor examines fields in the header of the data packet to produce a predicted profile. The production of a predicted profile may, however, vary with regard to what portions of the data packet are examined, depending upon the specific communications protocol utilized. For example, in some protocols, a sequence number is associated with a particular frame or data packet. In such a case the receiving station would compute the sequence number that would be associated with the next data packet when creating a predicted profile. The information utilized in producing a predicted profile may even lie outside of the data packet header.

In addition, the size and location of fields that are compared may vary in some protocols. For example, a bit in the header of a data packet may be utilized to indicate whether a certain type of addressing scheme is being utilized, in which case certain other bits in the header may or may not be significant.

In accordance with a preferred embodiment of the present invention, the receiving station would (1) examine the header of the first data packet, (2) determine which fields of subsequent data packets are significant, (3) copy or compute, as necessary, significant fields from the first header into the predicted profile, (4) construct a mask for fields which are not significant, (5) logically AND the mask with the second data packet header to eliminate insignificant fields, and (6) compare the result with the predicted profile. Some of these steps may not be required, depending upon the protocol utilized. Alternatively, as set forth above, predicted fields in the header may be compared utilizing IF statements or similar constructs in the code, rather than a mask, as described above.

Figure 4:
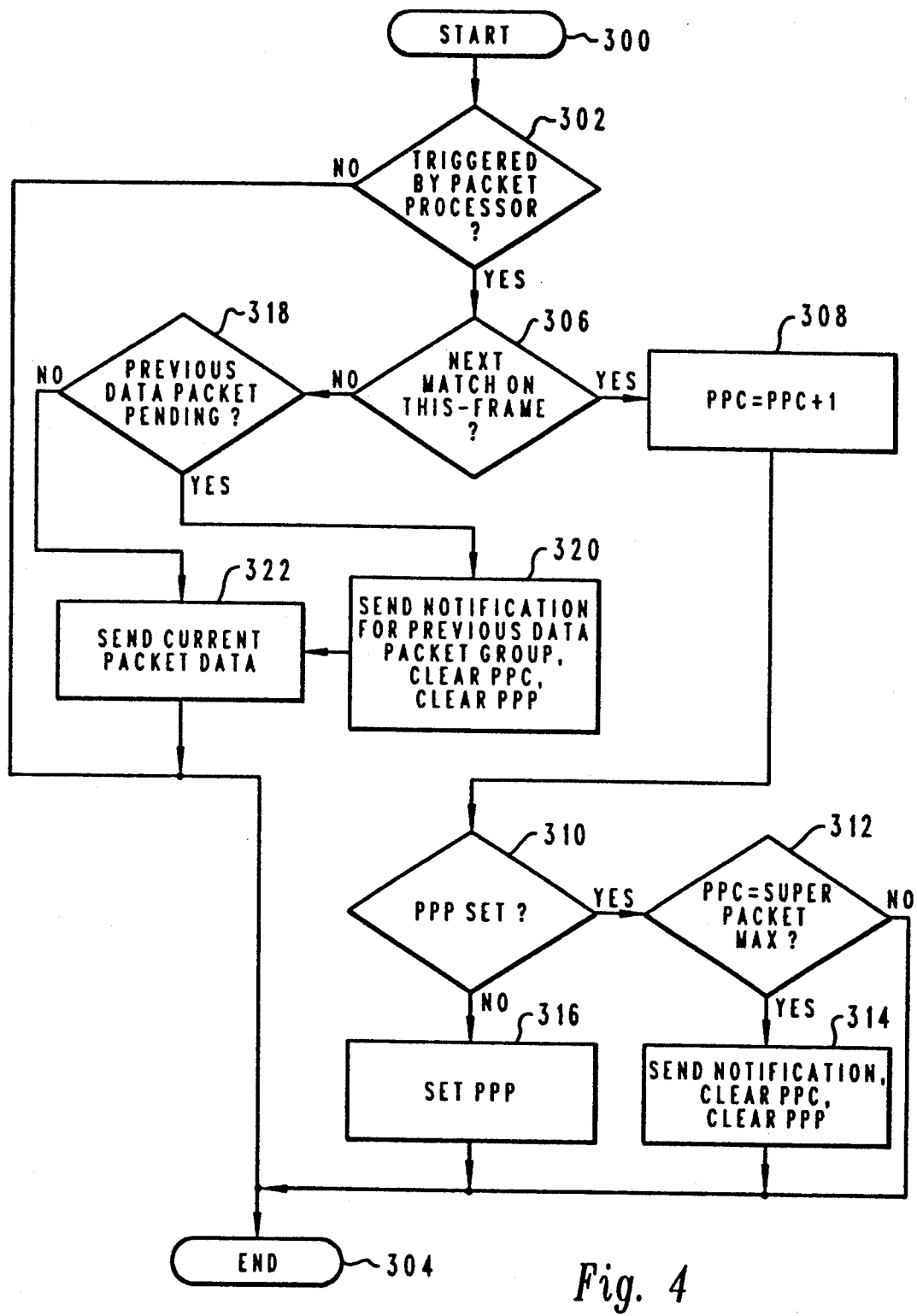
FIG. 4 is a high level flow chart of the processing of related data packets in a Direct Memory Access ("DMA") processor in accordance with a preferred embodiment of the present invention.

Next, FIG. 4 is a high level flow chart of the processing of related data packets in a Direct Memory Access ("DMA") processor in accordance with a preferred embodiment of the present invention. As illustrated, the process begins at block 300 and thereafter proceeds to block 302, which depicts a determination of whether or not the DMA process has been triggered by the data packet processor of FIG. 3. If the DMA processor has not been triggered by the data packet processor, the process terminates, as illustrated at block 304.

Referring again to block 302, if the DMA processor has been triggered by the data packet processor, the process then proceeds to block 306, which illustrates a determination of whether or not a next-match bit has been set on THIS-FRAME. If the next-match bit has been set on THIS-FRAME, the process then proceeds to block 308, which depicts an increase of the data packet pending count ("PPC") by one.

Block 310 illustrates a determination of whether or not the previous data packet pending ("PPP") bit has been set. If the previous data packet pending ("PPP") bit has been set, the process then proceeds to block 312 which depicts a determination whether or not data packet pending count ("PPC") is equal to a super data packet maximum. The maximum size of the data packet grouping, super data packet max, is a predetermined value. If the data packet pending count ("PPC") is equal to super data packet maximum, the process then proceeds to block 314, which illustrates the sending of a notification for the previous data packet group to the host processor and the clearing of the previous data packet pending ("PPP") bit and the pending data packet count ("PPC"). Thereafter the process terminates, as illustrated in block 304.

Referring again to block 310, if the previous data packet pending ("PPP") bit is not set, the process then proceeds to block 316, which illustrates the setting of the previous data packet pending ("PPP") bit. Thereafter, the process terminates, as illustrated in block 304. If the previous data packet pending ("PPP") bit is set, as determined at block 310, the process passes to block 312. Block 312 illustrates a determination of whether or not the data packet pending count ("PPC") is not equal to the super data packet max, then the process terminates, as illustrated in block 304.

Referring again to block 306, if the next match bit is not on for THIS-FRAME, the process then proceeds to block 318, which illustrates a determination of whether or not a previous data packet is pending, by determining whether or not the previous data packet pending ("PPP") bit is set. If the previous data packet is pending, the process then proceeds to block 320, which depicts the sending of a notification for the previous data packet group, clearing the previous data packet pending ("PPP") bit, and clearing the data packet pending count ("PPC"). Next, as illustrated at block 322, the current data packet is sent to the host processor. Thereafter the process terminates, as illustrated in block 304.

Referring again to block 318, if the previous data packet has not been processed, the process then proceeds to block 322, which illustrates the sending of the current data packet to the host processor. Thereafter the process terminates, as illustrated in block 304.

Figure 5:
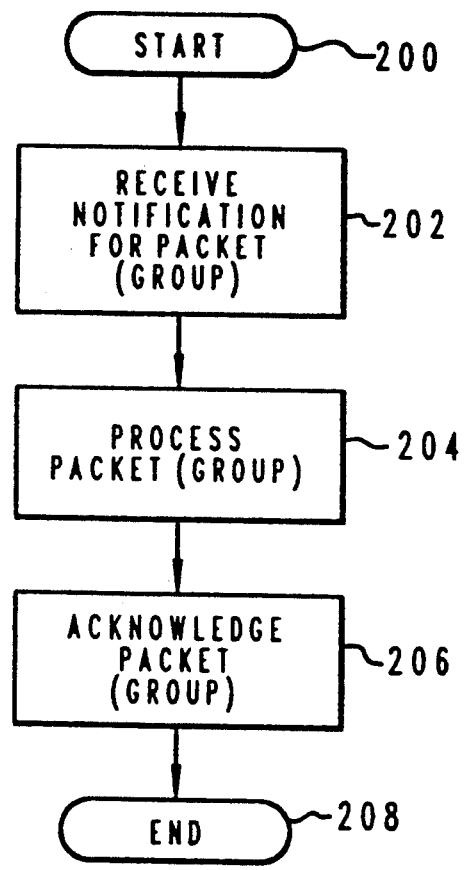
FIG. 5 depicts a high level flow chart of the host processor processing data packets from a receiving station, in accordance with a preferred embodiment of the present invention.

Referring now to FIG. 5 there is depicted a high level flow chart illustrating the host processor processing data packets from a receiving station in a preferred embodiment of the present invention. As illustrated, the process begins at block 200 and thereafter proceeds to block 202, which illustrates the reception of notification for a data packet or a group of data packets. Next, block 204 illustrates the processing of the data packet or group of data packets. The process then proceeds to block 206, which depicts the acknowledgment of the data packet or group of data packets. Thereafter, the process terminates, as illustrated at block 208. If, for example, ten related data packets were received individually by the host processor, rather than as a single group or as a super data packet when batched in accordance with the method and apparatus of the present invention, the process depicted in FIG. 3 should occur ten times. As a result, processing data packets individually when they may be processed as a group can significantly increase processing overhead.

Pseudo code which may be utilized to consolidate data packets or frames in preparing to send data packet arrival notifications to a host processor may be written for the DMA processor as follows:

```
WHEN Packet transfer to Remote Store Complete:
 BEGIN
  IF Next-Packet-Same-Connection Bit SET THEN
   BEGIN
    INCREMENT Pending Packet Count
    IF Previous packet pending SET THEN
     BEGIN
      IF Pending Packet Count = = Super Packet MAX THEN
       BEGIN
        Send Notification for Packet Group
        CLEAR Previous packet pending
        CLEAR Pending Packet Count
       END
     END
    ELSE
     SET Previous packet pending
   END
  ELSE
   BEGIN
    IF Previous packet pending SET THEN
     BEGIN
      Send Notification for Previous Packet Group
      CLEAR Previous packet pending
      CLEAR Pending Packet Count
     END
    Send Notification for Current Packet
   END
 END
```

The present invention also may be utilized in the processing of telephone calls. Many telephone systems translate voices into digital signals and transmit a telephone call in data packets, thus increasing the number of calls that may be made. This data packet processing method and system may be utilized in such a telephone system to reduce the time necessary to process the data packets carrying a telephone conversation.

Those skilled in the art will appreciate that one advantage of the present invention is that the transmission system is independent of the receiving system.

Another advantage of the present invention is that the transmission system does not require any special protocol for decreasing the processing overhead at the receiving system or computer. In fact, the transmission system does not even require knowledge that the present invention has been implemented in the receiving system or computer.

The present invention may be implemented in any data packet based protocol communications system, such as, X.25, SDLC, TR, Ethernet, or FDDI.

While the invention has been shown in only one of its forms, it is not thus limited but is susceptible to various changes and modifications without departing from the spirit thereof.

What is claimed is:

1. A computer program product for use in a data processing system to enhance processing of a plurality of related data packets received at a receiving station connected to a host system within said data processing system, said computer program product comprising:
    instruction means for sequentially receiving a plurality of data packets;
    instruction means for examining a first of said plurality of data packets;
    instruction means for generating a predicted profile for a related subsequent data packet in response to said examining;
    instruction means for comparing a second of said plurality of data packets to said predicted profile to determine if said second data packet is related to said first data packet; and
    instruction means for associating said first of said plurality of data packets and said second of said plurality of data packets if said second of said plurality of data packets matches said predicted profile, to form an associated data packet group.

2. A method in a data processing system for enhancing processing of a plurality of related data packets received at a receiving station within said data processing system, said method comprising the steps of:
    sequentially receiving a plurality of data packets at said receiving station;
    examining a first of said plurality of data packets;
    generating a predicted profile for a related subsequent data packet in response to said examining;
    comparing a second of said plurality of data packets with said predicted profile to determine if said second data packet is related to said first data packet; and
    associating said first of said plurality of data packets and said second of said plurality of data packets if said second of said plurality of received data packets matches said predicted profile, to form an associated data packet group.

3. The method of claim 2 further including the step of storing data packets in said associated data packet group in a data buffer.

4. The method of claim 3 further including the step of connecting a host system to said receiving station and transmitting said associated data packet group stored in said data buffer to said host system, if a subsequent one of said plurality of data packets does not match said predicted profile.

5. The method of claim 2, wherein each of said data packets has a header and wherein said generating step comprising generating a predicted profile in response to examining said header.

6. The method of claim 5, wherein said comparing step includes comparing said header associated with a second of said plurality of data packets to said predicted profile to determine if said second of said plurality of data packets is related to said first of data packet.

7. A data processing system for enhancing processing of a plurality of related data packets received at a receiving station located within said data processing system, said data processing system comprising:
    means for sequentially receiving a plurality of data packets;
    means for examining a first of said plurality of data
    means for generating a predicted profile in response to said examining; and
    means for comparing a second of said plurality of data packets with said predicted profile to determine if said second data packet is related to said first data packet.
    means for associating said first of said plurality of data packets and said second of said plurality of data packets if said second of said plurality of data packets matches said predicted profile, to form an associated data packet group.

8. The data processing system of claim 7, wherein said means for comparing a second of said plurality of data packets with said predicted profile comprises a microprocessor.

9. The data processing system of claim 7, wherein said means for associating said first of said plurality of data packets and said second of said plurality of data packets if said second of said plurality of data packets matches said predicted profile to form an associated data packet group comprises a microprocessor.

10. The data precessing of claim 7 further comprising means for storing data packets in said associated data packet group in a data buffer.

11. The data processing system of claim 10 further including a host system connected to said receiving station and means for sending said associated data packet group stored in said data buffer to said host system in response to a failure of a subsequent one of said plurality of data packets to match said predicted profile.

12. A receiving station in a data processing system for receiving a plurality of data packets from a network according to a defined protocol, wherein said protocol contains no defined indicator that a data packet should be grouped with another data packet as part of an associated data packet group, said data processing system having a host portion comprising a host processor and host memory connected by a system bus, said receiving station comprising:
    a communications front end connected to said network for receiving a first and second data packet from said network;
    a packet storage coupled to said communications front end for temporarily storing said first and second data packets;
    means for determining whether said second data packet should be grouped with said first data packet including means for generating a predicted profile from said first data packet;
    means, responsive to said means for determining whether said second data packet should be grouped with said first data packet, for combining said first and second data packets to form an associated data packet group;

means for transmitting said associated data packet group to said host portion.

13. The receiving station of claim 12, wherein said means for determining whether said second data packet should be grouped with said first data packet includes means for comparing said predicted profile with said second data packet.

14. The receiving station of claim 13, wherein said means for comparing said predicted profile with said second data packet is a microprocessor.

15. A data processing system for receiving a plurality of data packets according to a defined protocol, wherein said protocol contains no defined indication that a data packet should be grouped with another data packet as part of an associated data packet group, said data processing system having a host portion and a receiving station, said data processing system comprising:

means for receiving a first data packet and a second data packet at said receiving station;

means for temporarily storing said first data packet and said second data packet;

means for determining whether said second data packet should be grouped with said first data packet including means for generating a predicted profile from said first data packet;

means, responsive to said means for determining whether said second data packet should be grouped with said first data packet, for combining said first data packet and said second data packet to form an associated data packet group; and means for transmitting said associated data packet group to said host portion.

16. The data processing system of claim 15, wherein said means for determining whether said second data packet should be grouped with said first data packet includes means for comparing said predicted profile with said second data packet.

17. The data processing system of claim 16, wherein said means for comparing said predicted profile with said second data packet is a microprocessor.

* * * * *

UNITED STATES PATENT AND TRADEMARK OFFICE
CERTIFICATE OF CORRECTION

PATENT NO. : 5,260,942

DATED : November 9, 1993

INVENTOR(S) : Richard A. Auerbach, et al.

It is certified that error appears in the above-identified patent and that said Letters Patent is hereby corrected as shown below:

Col. 10, line 14, please add after "data" --packets;--.

Col. 10, line 50, please change "indicator" to --indication--.

Signed and Sealed this

Fifth Day of July, 1994

Attest:

BRUCE LEHMAN

Attesting Officer     Commissioner of Patents and Trademarks